US005764283A

United States Patent [19]
Pingali et al.

[11] Patent Number: 5,764,283
[45] Date of Patent: Jun. 9, 1998

[54] METHOD AND APPARATUS FOR TRACKING MOVING OBJECTS IN REAL TIME USING CONTOURS OF THE OBJECTS AND FEATURE PATHS

[75] Inventors: Sarma VGK Pingali, Red Bank; Jakub Segen, Fair Haven, both of N.J.

[73] Assignee: Lucent Technologies Inc., Murray Hill, N.J.

[21] Appl. No.: 586,012

[22] Filed: Dec. 29, 1995

[51] Int. Cl.$^6$ .............................. H04N 5/225; H04N 5/14
[52] U.S. Cl. ........................ 348/169; 348/699; 382/190
[58] Field of Search .................................. 348/699, 416, 348/169, 399, 411, 26; 382/190, 242, 243

[56] References Cited

U.S. PATENT DOCUMENTS

| | | | |
|---|---|---|---|
| 4,907,169 | 3/1990 | Lovoi | 364/513 |
| 5,091,976 | 2/1992 | Murayama | 382/56 |
| 5,247,586 | 9/1993 | Gobert et al. | 382/42 |
| 5,276,513 | 1/1994 | Van Der Wal et al. | 358/136 |
| 5,289,274 | 2/1994 | Kondo | 348/208 |
| 5,295,201 | 3/1994 | Yokohama | 382/48 |
| 5,398,068 | 3/1995 | Liu et al. | 348/416 |
| 5,444,791 | 8/1995 | Kamada et al. | 382/190 |
| 5,465,308 | 11/1995 | Hutcheson et al. | 382/159 |
| 5,537,155 | 7/1996 | O'Connell et al. | 348/699 |
| 5,546,129 | 8/1996 | Lee | 348/416 |
| 5,581,308 | 12/1996 | Lee | 348/699 |
| 5,581,309 | 12/1996 | Okino et al. | 348/699 |
| 5,598,216 | 1/1997 | Lee | 348/416 |
| 5,612,743 | 3/1997 | Lee | 348/409 |
| 5,619,281 | 4/1997 | Jung | 348/699 |
| 5,640,468 | 6/1997 | Hsu | 382/190 |
| 5,650,828 | 7/1997 | Lee | 348/625 |
| 5,673,339 | 9/1997 | Lee | 382/236 |
| 5,687,249 | 11/1997 | Kato | 382/104 |

OTHER PUBLICATIONS

Huang et al., A New Motion Compensation Method For Image Sequence Coding Using Hierachical Grid Interpolation, IEEE toC&S, pp. 42–51, Feb. 1994.

Richard F. Rashid, Towards a System for the Interpretation of Moving Light Displays, Nov., 1980, IEEE Transactions on Pattern Analysis and Machine Intelligence, vol. PAMI-2, No. 6, pp. 574–581.

M. Rossi et al., Tracking and Counting Moving People, 1994 IEEE, IRST–Istituto per la Ricerca Scientifica e Tecnologica, pp. 212–216.

K. Rohr, Towards Model–Based Recognition of Human Movements in Image Sequences, Jan. 1994, CVGIP: Image Understanding vol. 59, No. 1, pp. 94–115.

S.M. Smith et al., ASSET-2: Real–Time Motion Segmentation and Shape Tracking, Aug., 1995, IEEE Transaction On Pattern Analysis and Machine Intelligence vol. 17, No. 8 pp. 814–820.

*Primary Examiner*—Richard Lee
*Assistant Examiner*—David R. Vincent

[57] ABSTRACT

A method and apparatus for tracking moving objects, such as people, in real time by grouping existing feature paths from a current video frame with preexisting clusters from current video frames. Grouping is accomplished by selecting, as a candidate cluster to a specified feature path, the cluster having the closest relative distance to the specified feature path. The relative distance is calculated according to a function having a first component and a second component. The first component is representative of a maximum displacement between the select feature path and the candidate cluster, and the second component is representative of the difference between velocity vectors defining the select feature path motion and velocity vectors defining the candidate cluster motion. The method and apparatus also provide for updating the candidate cluster with parameters obtained from the select feature path and for merging overlapping clusters.

12 Claims, 6 Drawing Sheets

METHOD AND APPARATUS FOR TRACKING MOVING OBJECTS IN REAL TIME USING CONTOURS OF THE OBJECTS AND FEATURE PATHS

BACKGROUND OF THE INVENTION

I. Field of the Invention

This invention relates to a method and apparatus for tracking moving objects, especially moving people, in real time. More particularly, the present invention is directed to a method and apparatus for obtaining spatio-temporal tracks corresponding to the movement of people from a continuous video stream containing video data. Most particularly, the invention provides a clustering technique employed in a method and apparatus for tracking, in real time, moving people represented by images obtained from a continuous video stream.

II. Description of Related Art

Tracking systems for moving objects typically generate trajectories corresponding to the motion of an object within the view of a camera. The trajectories or tracks typically consist of a sequence of x, y (location) coordinates and of time coordinates. The information from these trajectories has a variety of applications. For example, the information can be used to count the number of objects, such as people or vehicles, crossing a reference line and to associate a particular direction with each crossing. In addition, such trajectories may be used to determine the number of people present within the field of view of a camera at any instant, which information is useful for product marketing such, for example as, in determining the effectiveness of a particular advertisement or advertising technique. Tracking systems may also be employed for measuring consumer traffic throughout, for example, the aisles of a store, etc., including the length of time that particular persons spend in specific aisles.

Several methods or systems have been developed for the tracking of moving objects, including people. For example, in Rashid, R. F., "Towards A System For The Interpretation Of Moving Light Displays", 2 *IEEE Transactions on Pattern Analysis and Machine Intelligence*, 574–581 (1980), a method is described for interpreting moving light displays (MLD). In general, Rashid teaches segmenting out from MLD images individual points corresponding to moving people. The individual points are grouped together to form clusters based on, inter alia, the positions and velocities of the individual points; the formed clusters represent individual objects. Tracking is performed by matching points between consecutive frames based on the relative distances between the location of points in the current frame and the location of predicted points in a previous frame. The predicted position is based on the average velocity of the point in the previous frame and the relative distance, which is calculated using a Euclidean function.

The technique described by Rashid has several drawbacks. Specifically, the MLD system requires several frames before a good object separation is obtained, and no criteria is provided for determining when satisfactory object separation has occurred. In addition, no mechanism is provided for propagating the generated clusters to prior and subsequent frames for continuity in the motion representation.

In another tracking system described in Rossi, M. and Bozzoli, A., "Tracking And Counting Moving People", *Proceedings Of The Second IEEE International Conference On Image Processing*, 212–16 (1994), a vertically mounted camera is employed for tracking and counting moving people. This system operates under the assumption that people enter a scene along either the top or bottom of the image where alerting zones are positioned for detecting people moving into the scene. A major drawback of this system, however, is that in reality people can also appear in a scene, inter alia, from behind another object or from behind an already-identified person. In other words, people may be wholly or partially occluded upon initially entering a scene and such persons would not be identified by this system. The problem of identifying occluded persons is also present in the system described in Rohr, K., "Towards Model Based Recognition Of Human Movements In Image Sequences", 59 *Computer Vision, Graphics And Image Processing: Image Understanding*, 94–115 (1994).

In addition, the systems described in Smith, S. M., and Brady, J. M., "A Scene Segmenter: Visual Tracking of Moving Vehicles", 7 *Engineering Applications Of Artificial Intelligence* 191–204 (1994); and "ASSET-2: Real-Time Motion Segmentation And Shape Tracking", 17 *IEEE Transactions On Pattern Analysis And Machine Intelligence*, 814–20 (1995), are designed specifically for tracking objects such as moving vehicles, and accordingly identify features representing corners or abrupt changes on the boundaries of the vehicles. This approach utilizes the fact and requires that the tracked objects are rigid and, thus, permits the use of constant velocity or constant acceleration models, techniques clearly unavailable for the tracking of people.

SUMMARY OF THE INVENTION

The present invention provides, inter alia, a method and apparatus for tracking moving objects, and most especially people, in real time. The method includes the steps of matching a select feature path representing motion of the features of a person with a candidate cluster chosen from a plurality of preexisting clusters representing motion of the person. The select feature path has a portion concurrent or overlapping in time with some of the clusters in the plurality of clusters. The candidate cluster is chosen as the cluster closest in distance to the select path. Once the candidate cluster is chosen, the parameters of the candidate are updated based on the parameters of the select path.

The distance between the select path and the preexisting clusters is calculated in accordance with a function having two components. The first component is representative of a maximum displacement between the select feature path and the candidate cluster, and the second component is representative of the difference between velocity vectors defining motion of the select feature path and velocity vectors defining motion of the candidate cluster.

An apparatus constructed in accordance with the invention includes means for calculating the distance between a select feature path representing motion of the features of an object and a plurality of preexisting clusters, some of which overlap in time with the select feature path. The distance is calculated using a function having a first component and a second component. The first component is representative of a maximum displacement between the select feature path and each preexisting cluster, and the second component is representative of the difference between velocity vectors defining motion of the select feature path and velocity vectors defining motion of each preexisting cluster. Means are also provided for selecting, from the preexisting clusters, a candidate cluster having the smallest distance to the select feature path. In a preferred embodiment, the functions of the calculating means and selecting means are performed by a computer.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

Figure 1:
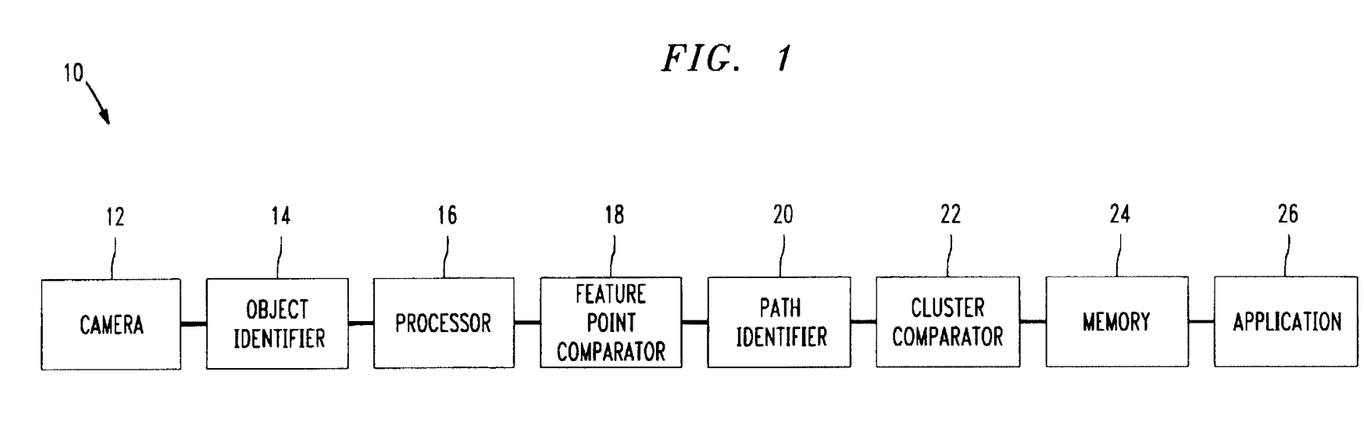
FIG. 1 is a block representation of a tracking apparatus constructed in accordance with the teachings of present invention.

A block representation of an apparatus 10 for tracking people in real time in accordance with the present invention is depicted in FIG. 1. As there shown, a camera 12 inputs images in the form of a continuous video signal formed of a serial plurality of previous frames and a current frame, with each frame comprised of pixels, to an object identifier 14. In identifier 14, pixels from the current frame corresponding to an object image, such as a moving person, are identified and distinguished from pixels representing a background of the current frame and the object pixels are provided to a processor 16. An image of the object represented by the object pixels is generated by the processor 16, which also identifies a boundary or contour of the image as well as the pixels defining the image contour. In addition, the processor 16 identifies the points on the image contour corresponding to regions of extreme curvature (hereinafter "feature points"), each having a distinct location in the form of, for example, x, y coordinates. The feature points indicate object features which are typically the extremities of a person, such as the hands, arms, legs and head. The identified feature points of a current frame are then compared by a feature point comparator 18 to feature points obtained from the immediately preceding frame to identify and associate most, if not all, of the immediately preceding feature points with the current feature points.

Upon completion of the comparison by the feature point comparator 18, which also identifies the prior corresponding feature points, data corresponding to the current and corresponding prior feature points are provided to a path identifier 20. If a current feature point does not have a corresponding previous feature point, then the current "un-matched" feature point is added in an appropriate location to the contour object of the current frame.

The data provided to the path identifier 20 is used to update existing feature paths that were created from previous matched or corresponding feature point pairs from previous frames. The feature path structures contain location coordinates (i.e. x, y coordinates), time coordinates for each feature point along a path, as well as an index to identify the corresponding contour object. The path identifier 20 correlates existing feature paths with the identified current and previous feature point pairs, generates new feature paths, if necessary, and also groups related feature paths, i.e. paths sharing similar coordinates such as time, motion, etc., into clusters representing the movement of a particular person. In addition, the path identifier 20 either identifies-existing paths with a previously identified cluster or, if no "match" is found for a particular feature path, the path identifier 20 generates a new cluster corresponding to the "un-matched" feature path. If a path is associated with a previous cluster, the parameters of that path are used to update the associated cluster.

The cluster data information generated by the path identifier 20 is then supplied to a cluster comparator 22 which compares the supplied cluster information to the remaining existing clusters to determine if any clusters can be merged into one. Specifically if the distance measurement, as more fully explained below, between a subject cluster and a selected cluster is the smallest relative distance, within a threshold distance, as compared to the distances between the subject cluster and the remaining non-selected clusters, then the subject cluster and the selected cluster are merged or grouped together. The grouping takes place not only in the current frame but in the previous frames as well so that estimates of the position of a person in a frame are continually refined based on information obtained in later frames. In addition, the cluster comparator 22 will validate existing clusters, merge clusters and destroy clusters that are deemed to be invalid based on an absence of cluster update within a predetermined period of time.

Each cluster represents the movement of a person (or object). Thus, the parameters defining a cluster are the length of time of the cluster as well as the path of movement of the cluster. This, as well as other information, define trajectories which may be stored in a memory 24 for use in an application apparatus 26 such, for example, as a computer to determine, among other things, the motion of persons as they pass a particular kiosk or display within the field of observation by camera 12. As will be appreciated, such information is directly relevant to the effectiveness of the display, i.e. whether people stop to view the display and the length of time of such viewing.

It should be readily understood that with the exception of camera 12, the individual components of apparatus 10 may be implemented by a combination of hardware and/or software elements and the use of either or both is intended to fall within the scope of the present invention.

In particular, a single computer may be employed to perform the functions of processor 16 and memory 24. Also, the functions performed by object identifier 14 and feature point comparator 18 may, likewise, be performed by a computer running appropriate software, as well as by dedicated or designated hardware units.

Figure 2:
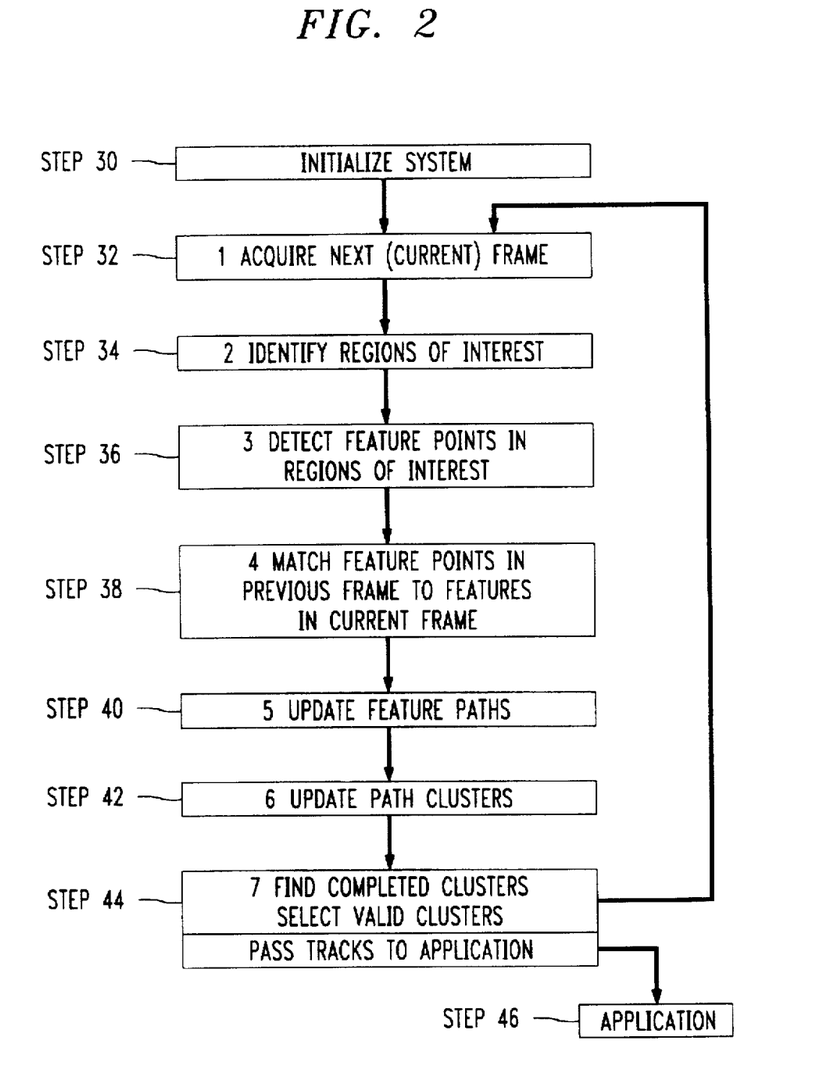
FIG. 2 is a flow chart showing the tracking method of the present invention.

With reference now to FIGS. 2–6, the preferred method employed by apparatus 10 for tracking people in real time will now be described. FIG. 2 provides an overall descriptive view of the inventive method, set forth in steps 30 to 46. As shown, after the apparatus 10 has been initialized (step 30), a current or present frame from a video signal is input to object identifier 14 (step 32). Next, the regions of interest such, for example, as images corresponding to people depicted in the current video frame are separated and identified from a background image also contained in the current video frame (step 34). With the regions of interest identified, contours of the image are then generated and feature points on the contour, representing the points of extreme curvature of the contour, are identified (step 36); these points are compared with feature points from previous frames to locate previous feature points corresponding to the present feature points (step 38), i.e. to form pairs of current and previous feature points.

After corresponding feature points have been identified in step 38, an existing feature path is associated with the corresponding current and prior feature point pairs (step 40) and the existing feature paths are then grouped into clusters (step 42) representing the motion of the image from which the current feature points were obtained. Like the feature points and feature paths, the clusters have defining parameters indicating, among other things, spatio-temporal coordinates as well as the number of paths contributing to that particular cluster.

If a particular path is not yet assigned to an existing cluster, the method includes a technique for determining which of the existing clusters is best suited for that path, whereupon that path is included in that cluster. Once included, the cluster parameters are updated with data including the parameters from the newly-included feature path. The existing clusters are then compared with each other to see if any clusters can be merged (step 44). In addition, the existing clusters are checked to determine when the last update for each cluster occurred. If the last update occurred outside a specified time interval, that cluster is examined for validity and, if invalid, is destroyed. The remaining valid clusters are then available for use in a variety of applications, as by way of example explained above.

Figure 3:
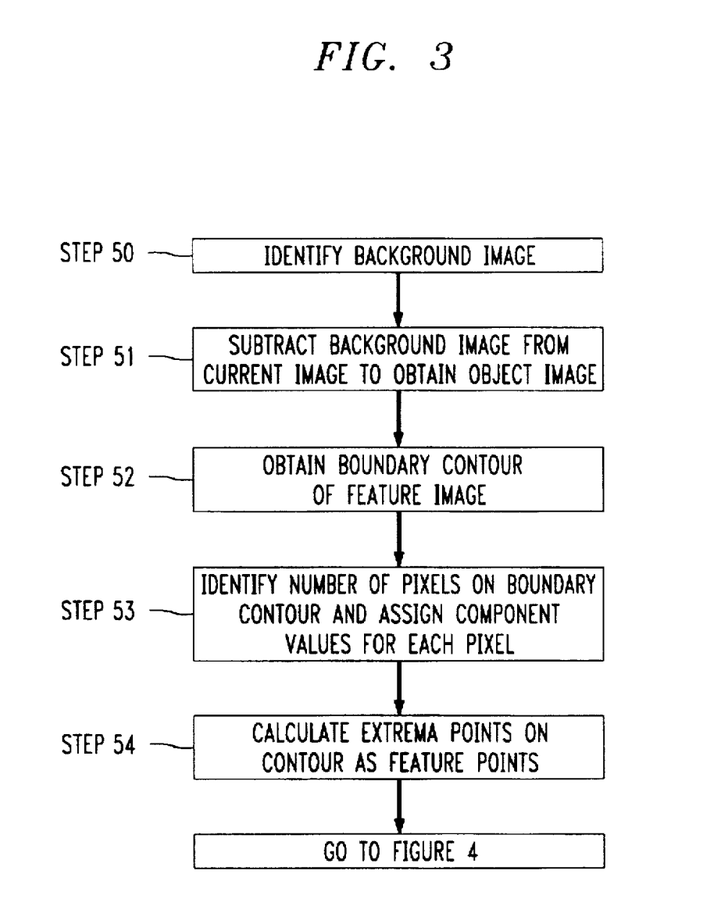
FIG. 3 is a flow chart detailing steps 34 and 36 of the method-shown in FIG. 2.

With reference now to FIG. 3, a preferred method for detecting feature points on the contours of images will now be described. To locate an object image, i.e. an image of a person, from within a current frame, the object image must be separated from a background image. Thus, the generally static background image must initially be identified and defined. One way of accomplishing this is to examine a large number of frames of a scene taken by the camera 12 and to obtain the mean value of all color components at each pixel over all of the frames. The standard deviation of each color component is also computed for each pixel over all of the frames and the mean value for the standard deviation is computed over all pixels. The mean value of each pixel is then subtracted from corresponding pixels in the current frame and the resulting values are thresholded to further distinguish objects in the current frame from the background. This results is an image of objects that were not in the static scene, i.e. the scene formed of the initial frames used to compute the background image. When camera 12 is positioned in a location at which the moving objects are primarily people, the resulting highlighted regions thus correspond to people or parts of people. It should be understood that this technique for obtaining an object image is but one of several such techniques which are known in the art; accordingly, other known techniques may alternatively be employed within the intended scope of the present invention.

The above-described method of obtaining an object image and separating it from a background image is represented by steps 50 and 51 of FIG. 3. Once an object is identified, a contour or boundary of the object image is obtained using a standard contour tracing algorithm such, for example, as the algorithm described in *Pavlidis, T., Structural Pattern Recognition*, Springer Verlag, N.Y., 1977. From these bounding contours, a complete contour of the object is obtained. A structure corresponding to each contour is defined and each structure contains coordinates including position coordinates (x, y coordinates), orientation, curvature and color component values for every pixel on the contour. The structure also contains the size of the particular contour (i.e. the total number of pixels on the contour). The orientation and curvature components of each contour are computed by first passing each x and y coordinate value through a circular average filter, as is known by those of ordinary skill in the art. The orientation for each point on each contour is computed as the orientation of a chord connecting the end points of a window centered on a particular point-of-interest on the contour. The curvature is computed as the difference in orientations of the end points of a window centered on the point of interest. For the curvature computation, the window size is chosen as typically half of the window size for the orientation computation. These features of the method are set forth in steps 52 and 53 of FIG. 3.

Each object corresponding to each contour has particular features associated therewith and corresponding to, for example, the arms, legs and head of the person(s) represented by the contours. These features are located by calculating the extrema points on each contour. The points are then located by processing each curvature value with a circular average filter, as in generally known in the art. The extrema points on the contour are found as the values at which the zero crossings of the derivative of the curvature are located; upon location of the extrema points, all of the identifying features or components of each contour are stored in a memory. Typical contour components include x, y coordinates, orientation, curvature, color component values and an index identifying the location of each feature point on the contour. The identification of the feature points is performed by step 54 of FIG. 3.

Figure 4:
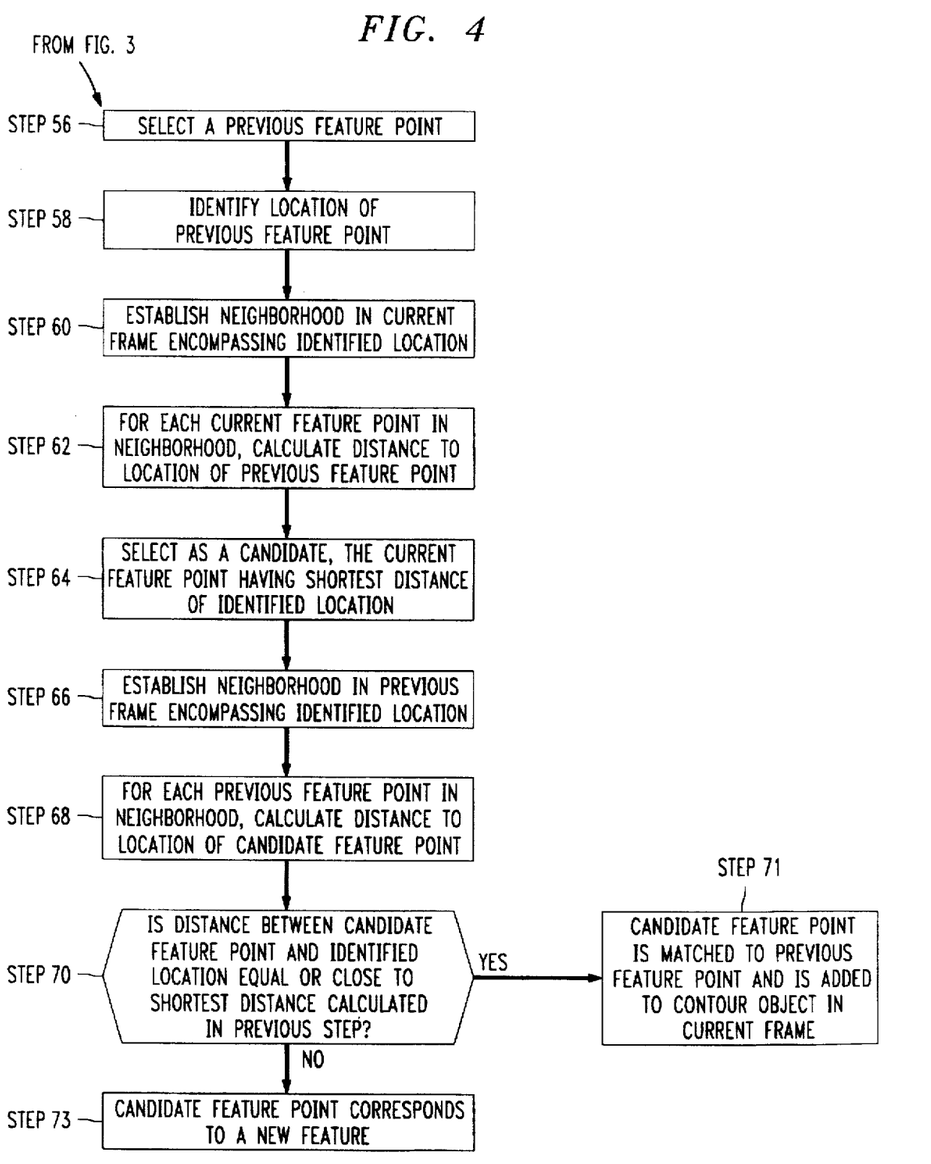
FIG. 4 is a flow chart detailing step 38 of the method shown in FIG. 2.

To track moving people in real time in accordance with the present invention, the identified feature points of the current frame must be correlated or associated with existing or previous feature points identified by the above-described process in previous frames. A preferred method of coordinating existing feature points with prior feature points is indicated in FIG. 4. Initially, as there shown, a previous feature point is selected from a contour identified in the immediately preceding video frame and the locations of the selected previous feature points are identified (steps 56 and 58). With the location of the previous feature point known, a neighborhood or boundary is established in the current frame encompassing the identified location (step 60). The neighborhood established in the current frame will typically encompass several current feature points. For each current feature point contained in the neighborhood, the distance between each current point and the selected previous point is calculated according to the following equation:

$$(dx^2+dy^2)/\sigma_x^2+do^2/\sigma_o^2+dc^2/\sigma_c^2, \tag{1}$$

where dx, dy, do and dc, respectively, correspond to the difference in the location (x, y), the orientation and the curvature values between the feature point and the current point. The distance calculation is not a Euclidean calculation but is computed on a weighted formula with the lowest weight associated with the x and y components. Typical weights for the components are: $\sigma_x=3$, $\sigma_o=10$ and $\sigma_c=10$.

Once the distances between a selected previous feature point and each current feature point in the neighborhood have been calculated (step 62), the current feature point within the neighborhood corresponding to the shortest calculated distance is selected as a candidate for the new feature point corresponding to the selected previous feature point (step 64), i.e. a candidate for a match. Although this method of selecting a current feature point from the location of a selected previous feature point may be sufficiently accurate for some applications, in the herein-described embodiment it is preferred that the candidate match point is then used as a reference check to insure that the candidate current feature point is, indeed, the correct match for the selected previous feature point.

This is accomplished by establishing a neighborhood in the immediately preceding frame, i.e. the frame containing the previously selected feature point, about the location of the chosen candidate match point. The neighborhood will contain other previously identified feature points as well as the previously selected feature point. The distance is again calculated using equation (1) between the candidate match point and each of the previous feature points in the neighborhood. The candidate point chosen in step 64 is the correctly identified corresponding point to the previously selected feature point in step 56, i.e. the correct match, if the distance between the candidate feature point and the identified location of the previous feature point equals or is within a minimum range to the shortest distance calculated between each previous feature point in the neighborhood and the location of the candidate feature point. If the candidate feature point is not within a certain minimum distance to the previous feature point location, then the candidate feature point is determined to be a new feature point and is added as a new point on the contour of the object in the current frame. This process takes place in step 70.

It should be understood that the movement of the feature points from one frame to the next indicates motion of a corresponding feature across the frames of the video signal. This motion is represented in terms of feature paths that are formed out of current and corresponding previous feature point pairs. The structure of each feature path contains x, y position coordinates as well as time coordinates for each feature point along each path. In addition, each feature path is indexed to a particular contour object and each feature path structure has a starting time at which the particular path began, the length of the path, a bounding spatial rectangle containing the path, and status bits to indicate whether the path structure is associated with a current (i.e. currently active) cluster, as more fully explained below, or if the path has ended. The path structure contains x, y and time coordinates for each feature point along the path as well as an index to the contour object for each point. In addition, the path structure denotes the creation time of the path and includes status bits to indicate whether the path structure is free and if the path has ended. A path at time t may be represented by $P(k,t)$, where k is an index to the path which varies from 1 to $p_t$ and $p_t$ is the total number of valid paths at time t. P has components (1, cx, cy, $x_1$, $y_1$, $t_1$, $x_2$, $y_2$, $t_2$, . . . . $x_l$, $y_l$, $t_l$) where l is the length of the path and ($x_i$, $y_i$, $t_i$) are the spatio-temporal coordinates of each point on the path. The terms (cx, cy) indicate the mean displacement of the path from its associated cluster, as is more fully described below.

When a feature point in an immediately preceding frame is matched, as explained above, to a feature point in the current frame, the feature path corresponding to the previous feature point is associated with the current feature point and that path is extended and updated to include the current feature point. In other words, the coordinates of the current feature point are included in the previous path coordinates and the values for the path length, bounding rectangle, etc. are also updated. For each feature point in the immediately preceding frame that does not find a match to a feature point in the current frame, the feature path associated with the previous point is ended by switching off the status bit for that path. On the other hand, for each feature point in the current frame with no match to a feature point in the previous frame, a new path of unity length is created containing only the parameters of the current feature point.

The existing feature paths indicate the motion of a particular feature, such as an arm or leg of a person, from one frame to the next. Thus, each person's image in each frame will have a plurality of feature paths associated with it, i.e. separate paths for the person's body and its extremities. The plurality of paths corresponding to a single person are typically short in duration and partially overlap in time. To track the motion of a person in the scene, the paths associated with the particular person must be grouped together to form a track or cluster. In other words, each path corresponding to feature movement is associated with a cluster corresponding to movement of a person. Accordingly, it should be understood that a cluster will have a structure similar to the structure of a feature path, i.e. will include x, y and time coordinates for each point along the cluster. In addition, each point comprising a cluster has an indicator signifying the total number of paths contributing to that particular cluster point. The mean and variance of the x and y coordinates across all points comprising each cluster as well as the total number of points contributing to the cluster are also maintained. Lastly, each cluster has a particular length associated therewith.

A path cluster at time t may be represented by $Z(k, t)$ where k is an index to the cluster and varies from 1 to $z_t$, and where $z_t$ is the total number of valid clusters at time t. A cluster Z has components (1, bx, by, bxx, byy, bk, $x_1$, $y_1$, $t_1$, $n_1$, $x_2$, $y_2$, $t_2$, $n_2$ . . . . $x_l$, $y_l$, $t_l$, $n_l$) where l is the length of the cluster, ($x_i$, $y_i$, $t_i$) represent the spatio-temporal coordinates of each point on the cluster, and $n_i$ represents the number of feature points contributing to the ith cluster point. The terms (bx, by) indicate the mean displacement of the position of a path contributing to the cluster from the coordinates ($x_i$, $y_i$) of the cluster. The terms (bxx, byy) indicate the variances in the displacement of the position of a path contributing to the cluster from the cluster coordinates. The term "bk" represents the total number of paths contributing to the cluster.

Figure 5:
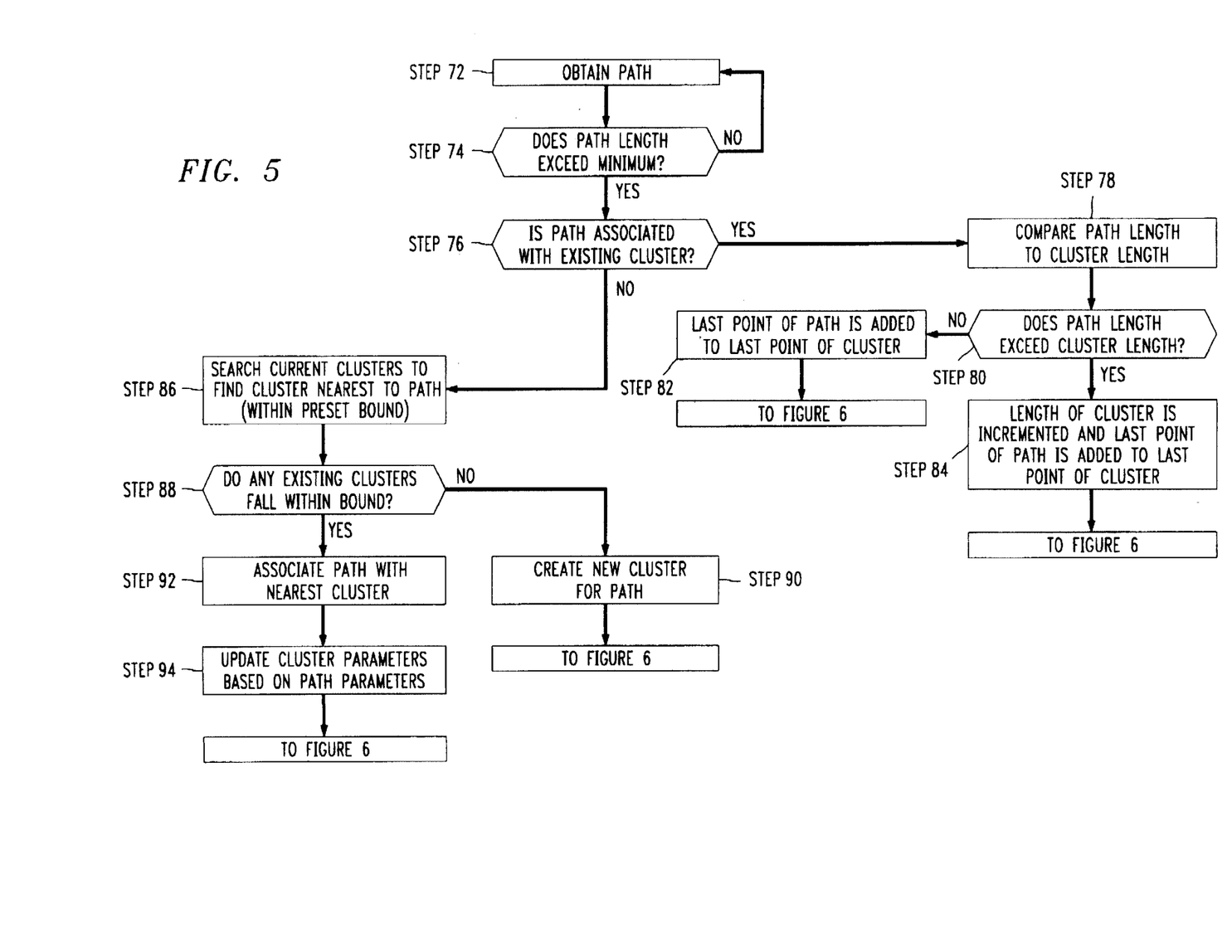
FIG. 5 is a flow chart detailing steps 40 and 42 of the method shown in FIG. 2.

As noted above, each existing feature path is attempted to be associated with an existing cluster formed from previous frames. If a particular feature path cannot be associated with an existing cluster, then a new cluster encompassing that feature path will be formed. The inventive method for determining an appropriate existing cluster for association with each existing current feature path is depicted in FIG. 5 and will now be described.

Once a feature path is selected from the current frame, the length of that path is measured to determine whether the path length exceeds a certain predetermined minimum length (step 74). If it does not, then a different current path is obtained and its length is measured against the minimum length. If that path length does exceed the minimum, then a determination is made as to whether that path is already associated with an existing cluster. In other words, a determination is made as to whether the current path is representative of movement of a feature which is already associated with an existing cluster established from previous frames of the video signal (step 76); if so, the associated cluster is updated utilizing the parameters of the current path. For example, the overlap between the path and the cluster is checked to determine whether the length of the cluster requires adjustment, as by extending the cluster length (steps 78 and 80). If the length of the cluster must be extended, the length of the cluster is incremented and the last point of the path becomes the last point of the cluster. If, however, it is determined that the cluster length need not be extended, then the parameters or components of the last point of the path is used to update the last point of the cluster, i.e. the position, color, curvature, etc. (steps 82 and 84).

For example, if a path P of length p has an associated cluster Z of length q, then the cluster update proceeds as follows. If $P_{t_p} = Z_{t_q}$ the cluster is updated as $$(Z'_{x_q}, Z'_{y_q}) = \left( \frac{Z_{x_q} Z_{n_q} + P_{x_p} - P_{cx}}{Z_{n_q} + 1}, \frac{Z_{x_q} Z_{n_q} + P_{x_p} - P_{cy}}{Z_{n_q} + 1} \right) \quad (2)$$

$$Z'_{n_q} = Z_{n_q} + 1 \quad (3)$$

where $Z'_{x_q}$, $Z'_{y_q}$ and $Z'_{n_q}$ represent the updated cluster parameter values. $P_{c_x}$ and $P_{c_y}$ are calculated when the path is first associated with the cluster, as is more fully described below.

If $P_{t_p} \neq Z_{t_q}$ then the cluster is updated as follows:

$$q' = q+1 \quad (4)$$

$$Z_{x_q} = P_{x_p} - P_{c_x} \quad (5)$$

$$Z_{y_q} = P_{y_p} - P_{c_y} \quad (6)$$

$$n_q = 1 \quad (7)$$

As seen in the foregoing equations, the cluster update involves the computation of new mean values for the x and y coordinates of the cluster based on the current path and the existing mean and "count" values.

If, on the other hand, a current path has a length exceeding a minimum and is not yet associated with an existing cluster, i.e. the feature corresponding to the path has not yet been grouped with or represented by an existing cluster, then the existing clusters are searched to find a candidate cluster or "match" with the subject path. The cluster having the shortest distance to the path will of course be selected as the candidate. To determine this, the overlap lengths of the selected or current path with any existing clusters are computed. The sum of the mean squared difference between the x and y values of the path and the cluster is then computed over their entire overlap length. This measurement is a first distance measurement which is designated as "d" and is computed as follows:

$$d = \frac{1}{l} \left( \sum_{i=0}^{l-1} (P_{x_{a+i}} - Z_{x_{r+i}})^2 + \frac{1}{l} \sum_{i=0}^{l-1} (P_{y_{a+i}} - Z_{y_{r+i}})^2 \right) \quad (8)$$

where $P_{t_a} = Z_{t_r}$ represents the first instant of overlap between the path and the cluster. Another distance $\Delta$ is computed as the normalized sum of the mean squared distances of the x and y components of the tangent vectors along the path and the cluster over their overlap length. This distance $\Delta$ is computed as follows:

$$\Delta = \frac{\sum_{i=0}^{l-1} [(P_{\tau_{x_{a+i}}} - Z_{\tau_{x_{r+i}}})^2 + (P_{\tau_{y_{a+i}}} - Z_{\tau_{y_{r+i}}})^2]}{\text{Min}\left( \sum_{i=0}^{l-1} (P^2_{\tau_{x_{a+i}}} + P^2_{\tau_{y_{a+i}}}), \sum_{i=0}^{l-1} (Z^2_{\tau_{x_{r+i}}} + Z^2_{\tau_{y_{r+i}}}) \right) + 2l} \quad (9)$$

Thus, $\Delta$ is normalized for the values of the tangential components (velocity vectors) and for the overlap length. The tangent at each point along the path or cluster is estimated as a difference between the outputs of two linear predictive filters applied to the x and y components of the path or cluster trajectory in opposition directions, as shown below for the x component of a path:

$$P_{\tau_{x_i}} = P_{\tau 1_{x_i}} - P_{\tau 2_{x_i}}, i = 1, 2, \ldots p \quad (10)$$

where p is the length of the path and $$P_{\tau 1_{x_i}} = P_{\tau 1_{x_{i+1}}} + \alpha(P_{x_i} - P_{\tau 1_{x_{i+1}}}) \quad (11)$$

$$P_{\tau 1_{x_p}} = P_{x_p} \quad (12)$$

and $$P_{\tau 2_{x_i}} = P_{\tau 2_{x_{i-1}}} + \alpha(P_{x_i} - P_{\tau 2_{x_{i-1}}}), \quad (13)$$

$$P_{\tau 2_{x_1}} = P_{x_1} \quad (14)$$

If the distances "d" and "$\Delta$" lie within certain preset bounds, then the final distance between the path and a cluster is computed using the following equation:

$$D = \frac{\text{Max}(xx, xd)}{p_x^2} + \frac{\text{Max}(yy, yd)}{p_y^2} + \frac{\Delta}{p_\tau^2} \quad (15)$$

where $p_x$, $p_y$ and $p_\tau$ are weighting factors for the x, y and tangential distances, i.e. distances between velocity vectors. $p_x$ and $p_y$ are chosen based on typical dimensions of a person in the image. Typical values are $p_x = 45$, $p_y = 75$ and $p_\tau = 0.9$.

The xx, yy, xd and yd components are calculated as follows:

$$\beta_x = \frac{1}{l} \sum_{i=0}^{l-1} (P_{x_{a+i}} - Z_{x_{r+i}}) \quad (16)$$

$$\beta_y = \frac{1}{l} \sum_{i=0}^{l-1} (P_{y_{a+i}} - Z_{y_{r+i}}) \quad (17)$$

$$xd = (\beta_x - Z_{bx})^2 \quad (18)$$

$$yd = (\beta_y - Z_{by})^2 \quad (19)$$

$$\gamma_x = \frac{Z_{bx} Z_{bk} + \beta_x}{Z_{bk} + 1} \quad (20)$$

$$\gamma_y = \frac{Z_{by} Z_{bk} + \beta_y}{Z_{bk} + 1} \quad (21)$$

$$xx = \frac{((Z_{bx} - \gamma_x)^2 + Z_{bxx}) Z_{bk} + (\beta_x - \gamma_x)^2}{Z_{bk} + 1} \quad (22)$$

$$yy = \frac{((Z_{by} - \gamma_y)^2 + Z_{byy}) Z_{bk} + (\beta_y - \gamma_y)^2}{Z_{bk} + 1} \quad (23)$$

In the foregoing equations, ($\beta_x$, $\beta_y$) provide the mean displacement or translation of the path P from the cluster Z over their overlap length, and ($x_d$, $y_d$) the square of the difference between the existing mean value ($Z_{bx}$, $Z_{by}$) and the mean displacement ($\beta_x$, $\beta_y$) for displacement of paths contributing to the cluster Z. In addition, ($\gamma_x$, $\gamma_y$) represent the new mean values for path displacement from the cluster if P is merged with Z, and (xx, yy) represent the new variance in path displacements from the cluster if P is merged with Z.

Thus, D measures the displacement of the path from the cluster, i.e. the spread of the paths contributing to the cluster, and weighs these calculations with respect to the typical dimensions of a person. The cluster with the smallest value for the distance D from the path (assuming that the distance D is within a preset bound) is selected as the nearest cluster to the path whereupon the path is associated with the selected cluster (steps 86, 88 and 92).

Once the path is assigned, the cluster parameters are updated, based on the parameters of the newly-included path over the overlap length, according to the following equations in which i varies from 0 to l-1 (step 94):

$$P_{cx} = \frac{1}{l} \sum_{i=0}^{l-1} (P_{x_{o+i}} - Z_{x_{r+i}}) \quad (24)$$

$$P_{cy} = \frac{1}{l} \sum_{i=0}^{l-1} (P_{y_{o+i}} - Z_{y_{r+i}}) \quad (25)$$

$$(Z_{x_{r+i}}, Z_{y_{r+i}}) = \quad (26)$$

$$\left( \frac{Z_{x_{r+i}} Z_{n_{r+i}} + P_{x_{o+i}} - P_{cx}}{Z_{n_{r+i}} + 1}, \frac{Z_{y_{r+i}} Z_{n_{r+i}} + P_{y_{o+i}} - P_{cy}}{Z_{n_{r+i}} + 1} \right)$$

$$Z_{a_{r+i}} = Z_{n_{r+i}} + 1 \quad (27)$$

$$Z_{bx} = \frac{Z_{bx} Z_{bk} + P_{cx}}{Z_{bk} + 1} \quad (28)$$

$$Z_{by} = \frac{Z_{by} Z_{bk} + P_{cy}}{Z_{bk} + 1} \quad (29)$$

$$Z_{bxx} = \frac{(Z_{bxx} + Z_{bx}^2) Z_{bk} + \beta_x^2}{Z_{bk} + 1} - (Z_{bx})^2 \quad (30)$$

$$Z_{byy} = \frac{(Z_{byy} + Z_{by}^2) Z_{bk} + \beta_y^2}{Z_{bk} + 1} - (Z_{by})^2 \quad (31)$$

If the path length p is greater than the overlap length l of the path and the cluster, the cluster is extended as follows, with i varying from l to p-1, $$(Z_{x_{r+i}}, Z_{y_{r+i}}) = (P_{x_{o+i}} - P_{cx}, P_{y_{o+i}} - P_{cy}) \quad (32)$$

$$(Z_{n_{r+i}}) = 1 \quad (33)$$

If, however, the distance D falls outside of a preselected boundary, then the path cannot be associated with any existing cluster, whereupon a new cluster is created for that path (step 90).

Figure 6:
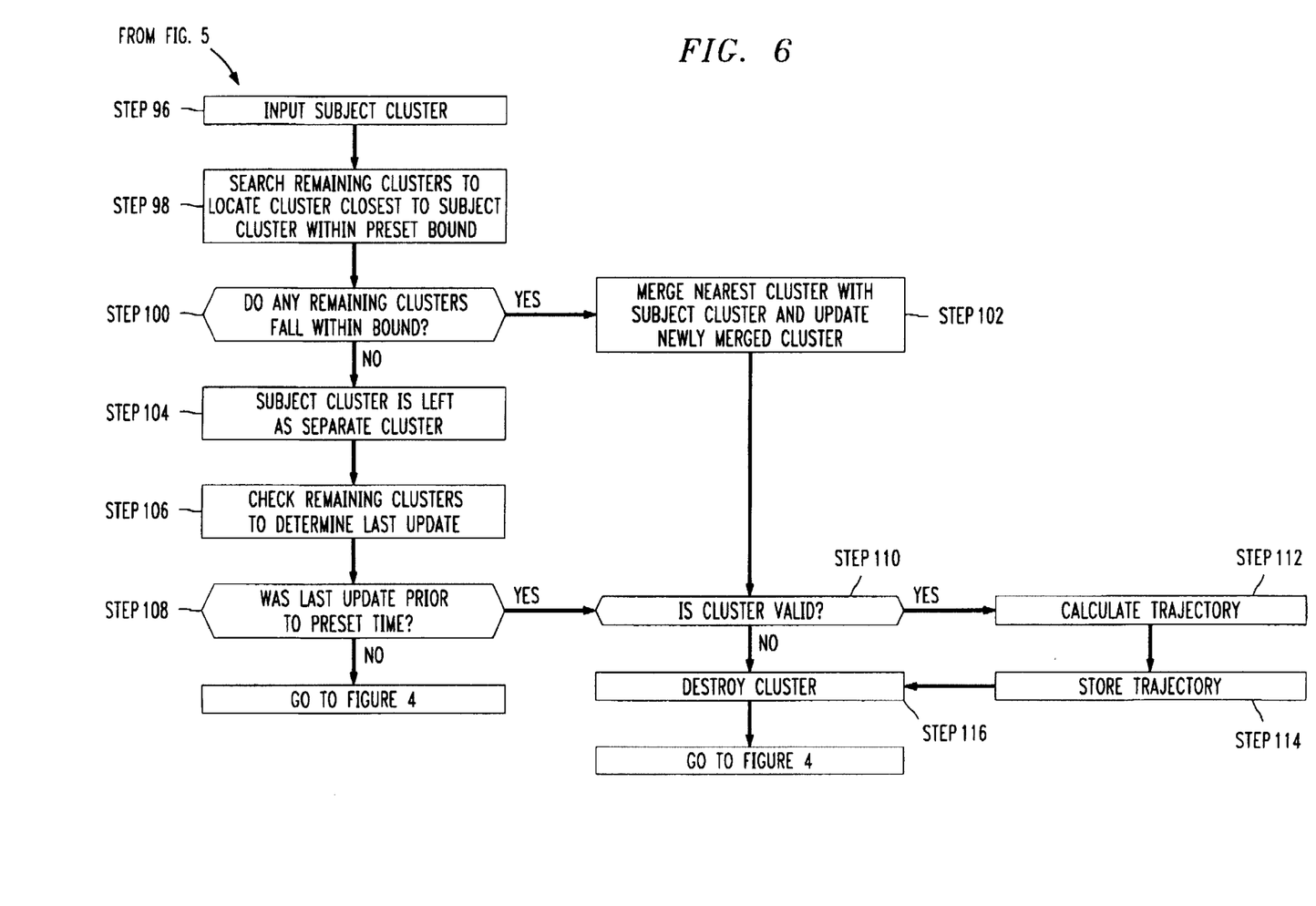
FIG. 6 is a flow chart detailing step 44 of the method shown in FIG. 2.

When all current paths from a current frame have either been associated with an existing cluster or incorporated in a newly-formed cluster, the remaining clusters are then checked to determine whether any of them can be merged with another. In other words, if two or more clusters represent movement of the same object or person, these clusters will be merged into a single cluster; this technique is similar to that described with respect to FIG. 5 for incorporating existing paths with existing clusters. Specifically, all of the remaining clusters are searched to locate the nearest cluster. If two clusters are within a certain minimum distance from each other, then those clusters are merged. This process is repeated until no additional mergers are possible, i.e. until the distance between respective clusters exceeds the minimum "merging" distance. The distance between two respective clusters is calculated in a similar manner to that set forth above. In the following equations, P refers to the selected cluster for which possible mergers are being sought, and Z refers to a candidate cluster for merger with the selected cluster P. Thus, equations 17-22 are modified for these calculations as follows:

$$xd = (P_{bx} + \beta_x - Z_{bx})^2 \quad (34)$$

$$yd = (P_{by} + \beta_y - Z_{by})^2 \quad (35)$$

$$\gamma_x = \frac{Z_{bx} Z_{bk} + (P_{bx} + \beta_x) P_{bk}}{Z_{bk} + P_{bk}} \quad (36)$$

-continued $$\gamma_y = \frac{Z_{by} Z_{bk} + (P_{by} + \beta_y) P_{bk}}{Z_{bk} + P_{bk}} \quad (37)$$

$$xx = \frac{((Z_{bx} - \gamma_x)^2 + Z_{bxx}) Z_{bk} + ((P_{bx} + \beta_x - \gamma_x)^2 + P_{bxx}) P_{bk}}{Z_{bk} + P_{bk}} \quad (38)$$

$$yy = \frac{((Z_{by} - \gamma_y)^2 + Z_{byy}) Z_{bk} + ((P_{by} + \beta_y - \gamma_y)^2 + P_{byy}) P_{bk}}{Z_{bk} + P_{bk}} \quad (39)$$

Again, the candidate cluster Z having the smallest distance "D" within a preset "merging" distance from the selected cluster P is chosen for merging with cluster P. After merger, the resulting combined cluster is updated (steps 98-102). If the length of the selected cluster P is less than the end point of the candidate cluster Z, then the updated values of the merged cluster over the overlap length between the candidate and selected clusters are obtained using the following equations:

$$(Z_{x_{r+i}}, Z_{y_{r+i}}) = \quad (40)$$

$$\left( \frac{Z_{x_{r+i}} Z_{n_{r+i}} + (P_{x_{o+i}} - \beta_x) P_{n_{o+i}}}{Z_{n_{r+i}} + P_{n_{o+i}}}, \frac{Z_{y_{r+i}} Z_{n_{r+i}} + (P_{y_{o+i}} - \beta_y) P_{n_{o+i}}}{Z_{n_{r+i}} + P_{n_{o+i}}} \right)$$

$$Z_{a_{r+i}} = Z_{n_{r+i}} + P_{n_{o+i}} \quad (41)$$

$$Z_{bx} = \frac{Z_{bx} Z_{bk} + (P_{bx} + \beta_x) P_{bk}}{Z_{bk} + P_{bk}} \quad (42)$$

$$Z_{by} = \frac{Z_{by} Z_{bk} + (P_{by} + \beta_y) P_{bk}}{Z_{bk} + P_{bk}} \quad (43)$$

$$Z_{bxx} = \frac{Z_{bxx} + (Z_{bx} - Z_{bx})^2) Z_{bk} + (P_{bxx} + (P_{bx} + \beta_x - Z_{bx})^2) P_{bk}}{Z_{bk} + P_{bk}} \quad (44)$$

$$Z_{byy} = \frac{(Z_{byy} + (Z_{by} - Z_{bx})^2) Z_{bk} + (P_{byy} + (P_{by} + \beta_y - Z_{by})^2) P_{bk}}{Z_{bk} + P_{bk}} \quad (45)$$

If, however, the length of the selected cluster P extends beyond the end point of the candidate cluster Z, then the candidate cluster Z is extended as follows (with i varying from l to p-1):

$$(Z_{x_{r+i}}, Z_{y_{r+i}}) = (P_{x_{o+i}} - \beta_x, P_{y_{o+i}} - \beta_y) \quad (46)$$

$$Z_{n_{r+i}} = P_{n_{o+i}} \quad (47)$$

If the smallest distance "D" between the selected cluster P and any of the current clusters is greater than the minimal "merging" distance, then the subject cluster P is treated as a separate cluster and is not merged (step 104).

The above-described technique permits the grouping of cluster evidence which is gathered over a plurality of frames from a video signal while operating in real time. The grouping or merging is performed not only for the clusters in the current frame but for clusters from previous frames as well. Thus, estimates of the position of a person in a particular frame are continually refined and updated on the basis of data or evidence obtained in subsequent frames.

Once all mergers have taken place, as explained above, the existing clusters are examined to determine when the respective last update of each occurred. If a cluster has not been updated within a predetermined length of time, it is likely that the person associated with that cluster has moved out of view of the camera and, thus, that the cluster associated therewith can now be destroyed. Before doing so, however, it is preferred that the cluster is first checked to determine if it is valid, i.e. if the cluster length is greater than a minimum length and the cluster has a minimum number of feature points contributing thereto. If this is the case, then the trajectory or track corresponding to each valid cluster may be stored in memory 24 and used to derive a variety of statistics which can be used for many different applications. For example, these statistics may be used in determining layout design and the effective placement of personnel in retailing environments, such as shopping malls. In addition, the effectiveness of promotional displays can be assessed by determining the number or volume of people travelling past a particular display and the length of time that each person stops or slows to view the particular display. Such statistics can also be used to assess the traffic habits of people as they travel, for example, on busy streets, in shopping malls, and in the individual aisles of stores.

It should be further understood that various techniques may be used to calculate feature points on the contours of objects and that the particular technique described herein for that purpose is simply the presently preferred technique. In addition, it is noted that for some systems, all points on an image and not just the contour points can be used to obtain motion paths for grouping into clusters.

Thus, while there have been shown and described and pointed out fundamental novel features of the invention as applied to preferred embodiments thereof, it will be understood that various omissions and substitutions and changes in the form and details of the devices illustrated, and in their operation, and in the method illustrated and described, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A method for tracking, in real time, a moving object represented by a video signal comprised of prior frames and a current frame and having an object image with features associated with the object, said method comprising the steps of:

matching a select feature path defined by x and y component values representing motion of the features of an object with a candidate cluster defined by x and y component values chosen from a plurality of preexisting clusters representing motion of the object, said select feature path having a portion concurrent in time with some of the clusters in said plurality of clusters, said candidate cluster selected as the cluster closest in distance to the select feature path, the distance being calculated according to a function having a first component and a second component, the first component being representative of a maximum displacement between the select feature path and the candidate cluster, and the second component being representative of differences between velocity vectors defining motion of the select feature path and velocity vectors defining motion of the candidate cluster wherein the select feature path is comprised of path points, wherein the candidate cluster is comprised of cluster points, and wherein the second component of the distance function is computed according to the following formula:

$$\Delta = \frac{\sum_{i=0}^{l-1}[(P_{x_{o+i}} - Z_{x_{p+i}})^2 + (P_{y_{o+i}} - Z_{y_{p+i}})^2]}{\text{Min}\left(\sum_{i=0}^{l-1}(P_{x_{o+i}}^2 + P_{y_{o+i}}^2), \sum_{i=0}^{l-1}(Z_{x_{r+i}}^2 + Z_{y_{p+i}}^2)\right) + 2l}$$

wherein P represents the select path, Z represents the candidate cluster, l represents the overlap length between P and Z, and wherein represents a first instant of overlap between the select path P and the candidate cluster Z.

2. The method of claim 1, wherein the distance is calculated according to the formula:

$$D = \frac{\text{Max}(xx,xd)}{\rho_x^2} + \frac{\text{Max}(yy,yd)}{\rho_y^2} + \frac{\Delta}{\rho_z^2}$$

wherein $p_x$, $p_y$ and $p_z$ are weighting factors for the x, y and $\Delta$ components, wherein $$xd = (\beta_x - Z_{bx})^2$$

$$yd = (\beta_y - Z_{by})^2$$

$$\beta_x = \frac{1}{l}\sum_{i=0}^{l-1}(P_{x_{o+i}} - Z_{x_{r+i}})$$

$$\beta_y = \frac{1}{l}\sum_{i=0}^{l-1}(P_{y_{o+i}} - Z_{y_{r+i}})$$

$$xx = \frac{((Z_{bx} - \gamma_x)^2 + Z_{bxx})Z_{bk} + (\beta_x - \gamma_x)^2}{Z_{bk} + 1}$$

$$yy = \frac{((Z_{by} - \gamma_y)^2 + Z_{byy})Z_{bk} + (\beta_y - \gamma_y)^2}{Z_{bk} + 1}$$

$$\gamma_x = \frac{Z_{bx}Z_{bk} + \beta_x}{Z_{bk} + 1}$$

$$\gamma_y = \frac{Z_{by}Z_{bk} + \beta_y}{Z_{bk} + 1}$$

wherein ($Z_{bx}$, $Z_{by}$) represent an existing mean value of components of the candidate cluster points, wherein ($\beta_x$, $\beta_y$) represent a mean displacement of the select path P from the candidate cluster Z over their overlap length, wherein ($x_d$, $y_d$) represent the square of a difference between the existing mean value ($Z_{bx}$, $Z_{by}$) and the mean displacement ($\beta_x$, $\beta_y$), wherein ($x_d$, $y_d$ represent the square of a difference between the existing mean value ($Z_{bx}$, $Z_{by}$) and the mean displacement ($\beta_x$, $\beta_y$) for the displacement of the paths contributing to the cluster Z, wherein ($\gamma_x$, $\gamma_y$) represent mean values for path displacements from the candidate cluster Z if the select path P is merged with cluster Z, and wherein (xx, yy) represent new variance values in path displacements from the candidate cluster Z if P is merged with Z.

3. A method for tracking, in real time, a moving object represented by a video signal comprised of prior frames and a current frame and having an object image with features associated with the object, said method comprising the steps of:

matching a select feature path defined by x and y component values presenting motion of the features of an object with a candidate cluster defined by x and y component values chosen from a plurality of preexisting clusters representing motion of the object, said select feature path having a portion concurrent in time with some of the clusters in said plurality of clusters, said candidate cluster selected as the cluster closest in distance to the select feature path, the distance being calculated according to a function having a first component and a second component, the first component being representative of a maximum displacement between the select feature path and the candidate cluster, and the second component being representative of differences between velocity vectors defining motion of the select feature path and velocity vectors defining motion of the candidate cluster, wherein the select feature path is comprised of path points, wherein the candidate cluster is comprised of cluster points, and wherein the second component of the distance function is computed according to the following formula:

$$\Delta = \frac{\sum_{i=0}^{l-1}[(P_{x_{o+i}} - Z_{x_{p+i}})^2 + (P_{y_{o+i}} - Z_{y_{r+i}})^2]}{\text{Min}\left(\sum_{i=0}^{l-1}(P_{x_{o+i}}^2 + P_{y_{o+i}}^2), \sum_{i=0}^{l-1}(Z_{x_{r+i}}^2 + Z_{y_{p+i}}^2)\right) + 2l}$$

wherein P represents the select path, Z represents the candidate cluster, l represents the overlap length between P and Z, and wherein $P_{t_r} = Z_{t_i}$ represents a first instant of overlap between the select path P and the candidate cluster Z.

4. The method of claim 3, wherein the distance is calculated according to the formula:

$$D = \frac{\text{Max}(xx, xd)}{\rho_x^2} + \frac{\text{Max}(yy, yd)}{\rho_y^2} + \frac{\Delta}{\rho_r^2}$$

wherein $p_x$, $p_y$ and $p_r$ are weighting factors for the x, y and $\Delta$ distances, and wherein $$xd = (\beta_x - Z_{bx})^2$$

$$yd = (\beta_y - Z_{by})^2$$

$$\beta_x = \frac{1}{l}\sum_{i=0}^{l-1}(P_{x_{o+i}} - Z_{x_{r+i}})$$

$$\beta_y = \frac{1}{l}\sum_{i=0}^{l-1}(P_{y_{o+i}} - Z_{y_{r+i}})$$

$$xx = \frac{((Z_{bx} - \gamma_x)^2 + Z_{bxx})Z_{bk} + (\beta_x - \gamma_x)^2}{Z_{bk} + 1}$$

$$yy = \frac{((Z_{by} - \gamma_y)^2 + Z_{byy})Z_{bk} + (\beta_y - \gamma_y)^2}{Z_{bk} + 1}$$

$$\gamma_x = \frac{Z_{bx}Z_{bk} + \beta_x}{Z_{bk} + 1}$$

$$\gamma_y = \frac{Z_{by}Z_{bk} + \beta_y}{Z_{bk} + 1}$$

wherein ($Z_{bx}$, $Z_{by}$) represent an existing mean value of components of the candidate cluster points, wherein ($\beta_x$, $\beta_y$) represent a mean displacement of the select path P from the candidate cluster Z over their overlap length, wherein ($x_d$, $y_d$) represent the square of a difference between the existing mean value ($Z_{bx}$, $Z_{by}$) and the mean displacement ($\beta_x$, $\beta_y$), wherein ($x_d$, $y_d$) represent the square of a difference between the existing mean value ($Z_{bx}$, $Z_{by}$) and the mean displacement ($\beta_x$, $\beta_y$) for the displacement of the paths contributing to the cluster Z, wherein ($\gamma_x$, $\gamma_y$) represent mean values for path displacements from the candidate cluster Z if the select path P is merged with cluster Z, and wherein (xx, yy) represent new variance values in path displacements from the candidate cluster Z if P is merged with Z.

5. The method of claim 4, wherein said updating step further comprises updating the parameters of the candidate cluster according to the formulas:

$$(Z'_{x_{r+i}}, Z'_{y_{r+i}}) = \left(\frac{Z_{x_{r+i}}Z_{n_{r+i}} + P_{x_{o+i}} - P_{cx}}{Z_{n_{r+i}} + 1}, \frac{Z_{y_{r+i}}Z_{n_{r+i}} + P_{y_{o+i}} - P_{cy}}{Z_{n_{r+i}} + 1}\right)$$

$$Z'_{n_{r+i}} = Z_{n_{r+i}} + 1$$

$$Z'_{bx} = \frac{Z_{bx}Z_{bk} + P_{cx}}{Z_{bk} + 1}$$

$$Z'_{by} = \frac{Z_{by}Z_{bk} + P_{cy}}{Z_{bk} + 1}$$

$$Z'_{bxx} = \frac{(Z_{bxx} + Z_{bx}^2)Z_{bk} + \beta_x^2}{Z_{bk} + 1} - (Z'_{bx})^2$$

$$Z'_{byy} = \frac{(Z_{byy} + Z_{by}^2)Z_{bk} + \beta_y^2}{Z_{bk} + 1} - (Z'_{by})^2$$

wherein Z' represents the updated component values for the candidate cluster, and wherein $P_{cx}$ and $P_{cy}$ are derived from:

$$P_{cx} = \frac{1}{l}\sum_{i=0}^{l-1}(P_{x_{o+i}} - Z_{x_{r+i}})$$

$$P_{cy} = \frac{1}{l}\sum_{i=0}^{l-1}(P_{y_{o+i}} - Z_{y_{r+i}})$$

wherein $P_{cx}$, $P_{cy}$ represent the mean displacement of the path components comprising a portion of the candidate cluster.

6. A method for tracking, in real time, a moving object represented by a video signal derived from prior frames and a current frame, the video signal having an object image and a background image, the object image having a bounding contour with extrema of curvature, said method comprising the steps of:

(a) isolating, from the current frame, the object image from the background image;

(b) detecting the bounding contour of the isolated object image and the extrema of curvature of the bounding contour;

(c) identifying a plurality of points on the detected bounding contour, some points in said plurality defined as feature points corresponding to a location of a feature of the object and represented by the extrema of curvature, each point in said plurality having coordinates associated therewith;

(d) comparing the coordinates of some of said identified points of the object image of the current frame with coordinates of corresponding previously identified points of an object image of an immediately preceding frame for correlating at least some of said current identified points with said corresponding ones of said previously identified points, each of said previously identified points having a previously defined feature path associated therewith, each feature path having components representing motion of said feature paths;

(e) assigning at least some of said identified points to a select one of the previously identified feature paths based on the comparison from said comparing step, and updating the components of the select feature path with the components of the associated points;

(f) updating parameters of a select one of a plurality of preexisting clusters, at least one of which represents motion of the moving object, with the components of the updated select feature path if the updated select feature path is associated with the select cluster; and (g) selecting a candidate cluster from said plurality of preexisting clusters if said updated select feature path is not associated with any of said preexisting clusters, and updating the parameters of the candidate cluster with the components of the select path, the candidate cluster being chosen based on a smallest distance value of a distance calculation between the select path and each of the preexisting clusters in said plurality of preexisting clusters.

7. The method of claim 6, wherein said distance calculation is derived according to a function having a first component and a second component, said first component being representative of a maximum displacement between the select feature path and the candidate cluster, and the second component being representative of the difference between velocity vectors defining motion of the select feature path and velocity vectors defining motion of the candidate cluster.

8. The method of claim 7, wherein said selecting step (g) further comprises forming a new cluster from said updated path if the smallest distance value between said updated path and each cluster in the plurality of preexisting clusters is greater than a predetermined threshold distance.

9. The method of claim 6, wherein the coordinates of the plurality of points includes location (x, y), orientation and curvature values and wherein said comparing step (d) further comprises calculating the distances between a selected previously identified feature point and the identified feature points of the object image of the current frame located within a neighborhood area containing a corresponding location of said selected previously identified feature point according to the formula:

$$(dx^2+dy^2)/\sigma_x^2+do^2/\sigma_o^2+dc^2/\sigma_c^2,$$

wherein dx, dy, do and dc, respectively, correspond to a difference in the location coordinates (x, y), orientation and curvature values between selected previously identified feature points and the identified feature point, and wherein $\sigma_x$, $\sigma_o$, and $\sigma_c$ are weighting values; and selecting, as a candidate to the previous feature point, a current feature point in said neighborhood corresponding to the minimum distance calculation.

10. A device for tracking, in real time, a moving object represented by a video signal derived from prior frames and a current frame, the video signal having an object image and a background image, the object image having a bounding contour with extrema of curvature, said device comprising:

means for isolating, from the current frame, the object image from the background image;

means for detecting the bounding contour of the isolated object image and the extrema of curvature of the bounding contour;

means for identifying a plurality of points on the detected bounding contour, some points in said plurality defined as feature points corresponding to the location of a feature of the object and represented by the extrema of curvature, each point in said plurality having coordinates associated therewith;

means for comparing the coordinates of some of said identified points of the object image of the current frame with coordinates of corresponding previously identified points of an object image of an immediately preceding frame for correlating at least some of said current identified points with said corresponding ones of said previously identified points, each of said previously identified points having a previously defined feature path associated therewith, each feature path having components representing motion of said feature paths;

means for assigning at least some of said identified points to a select one of the previously identified feature paths and updating the components of the select feature path with the components of the associated points;

means for updating parameters of a select one of a plurality of preexisting clusters, at least one of which representing motion of the moving object, with the components of the select feature path if the select path is associated with the select cluster; and means for selecting a candidate cluster if said updated select path is not associated with the select cluster, and updating parameters of the candidate cluster with the components of the select path, the candidate cluster being chosen based on a smallest distance value of a distance calculation between the select path and each cluster in the plurality of preexisting clusters.

11. The device of claim 10, wherein said selecting means further comprises calculating means for calculating the distance between the select path and each cluster in the plurality of preexisting clusters, said distance calculation being derived according to a function having a first component and a second component, the first component being representative of a maximum displacement between the select feature path and the candidate cluster, and the second component being representative of the difference between velocity vectors defining motion of the select feature path and velocity vectors defining motion of the candidate cluster.

12. The method of claim 11, further comprising means for forming a new cluster from said updated path if the smallest distance value between said updated path and each cluster in the plurality of preexisting clusters is greater than a predetermined threshold distance.

* * * * *